United States Patent [19]

Freedy et al.

[11] 3,861,762

[45] Jan. 21, 1975

[54] GUARD AND SCRAPER FOR AN IDLER WHEEL

[75] Inventors: Allan L. Freedy; Thomas P. Muller, both of Aurora; Gary L. Popdan, Oswego, all of Ill.

[73] Assignee: Caterpillar Tractor Co., Peoria, Ill.

[22] Filed: Oct. 17, 1973

[21] Appl. No.: 407,227

[52] U.S. Cl. ............................. 305/12, 280/158 R
[51] Int. Cl. ............................................ B62d 55/20
[58] Field of Search ............ 305/12, 31; 280/158 A, 280/158 R

[56] References Cited
UNITED STATES PATENTS

| | | | |
|---|---|---|---|
| 1,130,117 | 3/1915 | Strait | 305/12 |
| 2,108,291 | 2/1938 | McNally | 280/158 R |
| 2,146,882 | 2/1939 | Baker | 305/12 |
| 2,157,253 | 5/1939 | Yetter | 280/158 A |
| 2,326,486 | 8/1943 | Norelius | 305/31 |

Primary Examiner—Philip Goodman
Attorney, Agent, or Firm—Phillips, Moore, Weissenberger, Lempio & Strabala

[57] ABSTRACT

A guard and scraper structure is secured to an end idler wheel carrying bracket assembly in protecting relation to slidable bearing surfaces intermediate the bracket assembly and a pair of supporting parallel side frame portions, and in closely spaced relation to the idler wheel in order to scrape away material collected thereon.

6 Claims, 3 Drawing Figures

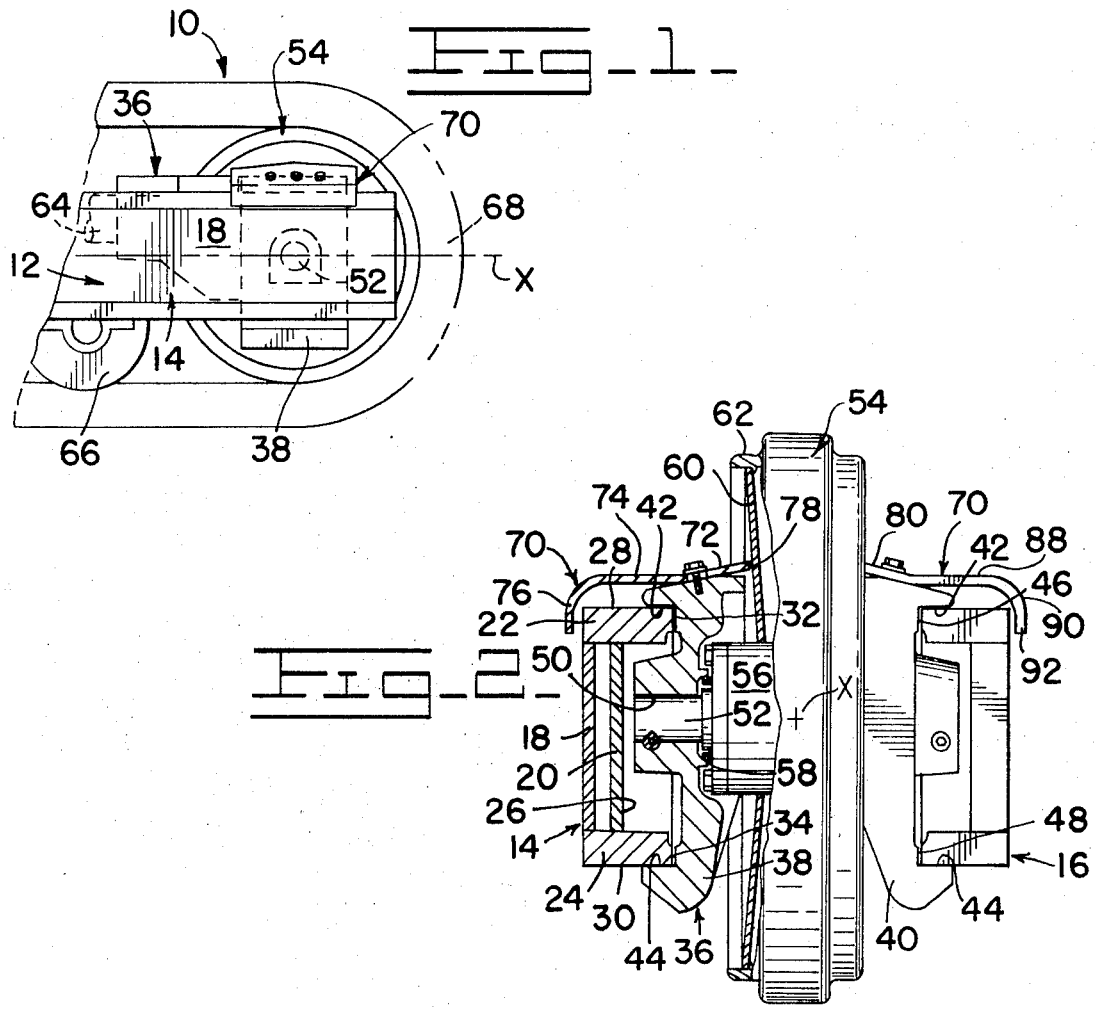
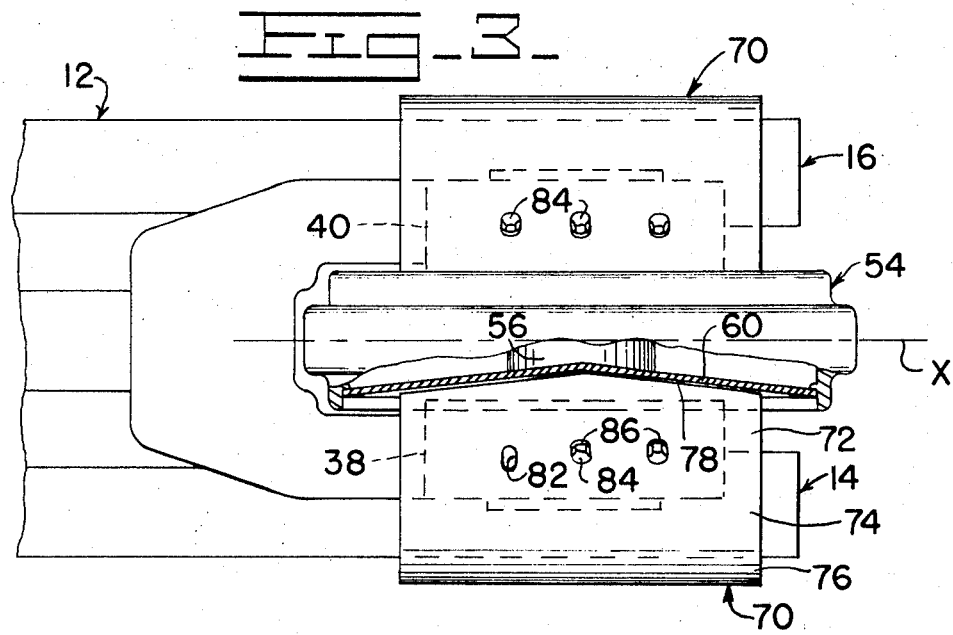

GUARD AND SCRAPER FOR AN IDLER WHEEL

BACKGROUND OF THE INVENTION

This invention relates to track-type vehicles, and more particularly, to such a vehicle which includes an idler associated with a bracket which is slidably mounted on a frame portion of a vehicle.

Various all-terrain vehicles which are equipped with endless track chains, such as a conventional track-type earthmoving machine, are expected to operate under extremely adverse conditions. As the vehicle is maneuvered, such track chains typically pick up mud and rock from the ground as they circumnavigate the supporting wheels, so that debris is deposited on the wheel supporting frames or brackets. Such wheel supporting brackets are frequently slidably mounted on longitudinally oriented bearing surfaces so that proper track tension may be retained under a variety of working conditions. An example of this type of mounting arrangement is set forth in U.S. application Ser. No. 242,701 (assigned to the assignee of the present application). This form of slidable mounting compounds the complexity of protecting the wheels and their associated bearings from the mud and dirt accumulated therearound. Such accumulation of debirs detrimentally affects the operation of the vehicle and causes excessive wear of the sliding surfaces and other support elements.

Of general interest in this area in U.S. Pat. No. 2,108,291 to McNally and U.S. Pat. No. 2,506,619 to Schwartz.

SUMMARY OF THE INVENTION

It is an object of this invention to provide, in a vehicle having a frame and a wheel-mounting bracket slidably associated with the frame, guard means for protecting the sliding surfaces thereof from debris and scraping the side of the wheel of debris.

It is a further object of this invention to provide such guard means associated with a vehicle of the above-mentioned type, which, while fulfilling the above object, allows for adjustment thereof to provide a proper debrisclearing function.

It is a still further object of this invention to provide, in a vehicle of the above-mentioned type, a guard assembly, which, while fulfilling the above objects, is extremely simple in design and effective in operation.

Broadly stated, the invention is in a vehicle having a frame portion, axle means for rotatably supporting a rotatable member, and bracket means slidably associated with the frame portion and mounting said axle means. The invention is the improvement which comprises guard means fixed relative to the bracket means and extending above the slidingly associated areas of the bracket means and frame portion.

BRIEF DESCRIPTION OF THE DRAWINGS

These and other objects of the invention will become apparent from a study of the following specification and drawings, in which:

FIG. 1 is a side elevational view of a portion of a vehicle incorporating the invention;

FIG. 2 is a front elevational view, partially in section, of a portion of the vehicle incorporating the invention; and FIG. 3 is a plan view of the portion of the vehicle incorporating the invention, and partially broken away and in section.

DESCRIPTION OF THE PREFERRED EMBODIMENT

With reference to the drawings, an undercarriage 10 of a track-type vehicle includes a track roller frame 12 having a pair of parallel side frame portions 14 and 16 oppositely symmetrically and laterally spaced from a longitudinal axis X of the vehicle. The outer frame portion 14 is fabricated from a pair of side plates 18, 20, a cover plate 22 and a bottom plate 24, which collectively form a boxlike beam construction with an inwardly facing pocket or longitudinal channel 26. The fabricated frame portion 14, and particularly the cover plate 22 and bottom plate 24 thereof, define an upwardly facing bearing surface 28 and a downwardly facing bearing facing bearing surface 30 respectively, as well as inwardly facing thrust bearing surfaces 32 and 34, respectively. It should be appreciated that the inside frame portion 16 has similar, symmetrically reversed components corresponding to the outside frame portion 14.

A wheel-supporting yoke assembly 36 includes a symmetrically related pair of forwardly extending, outwardly facing bearing brackets 38, 40 which are mounted between these frame portions 14 and 16, respectively. Each of the bearing brackets has a pair of substantially horizontally disposed sliding surfaces 42, 44 and a pair of substantially vertical outwardly facing thrust surfaces 46, 48 which are positioned proximate the bearing surfaces 28, 30 and inwardly facing surfaces 32, 34 of the frame portions 14, 16. A cylindrical bore 50 defined in each of the bearing brackets 38, 40 is adapted to receive a transversely oriented axle 52 on which is rotatably mounted an idler wheel shown generally by reference numeral 54.

The idler wheel 54 includes a rotatable hub 56 having internal bearings (not shown) which are protected from contamination by an annular seal assembly 58 disposed intermediate each of the bearing brackets 38, 40 and the hub 56. The idler wheel 54 includes a pair of conically shaped sides 60 (one shown) and a peripherally located stepped rim 62 which are fabricatingly related through peripheral welds or the like.

The idler wheel 54 is rotatably supported on the yoke 36 and bearing brackets 38, 40, which act as means associating the axle 52 and frame portions 14, 16. A longitudinally disposed shaft 64 is secured to the rear of the yoke assembly 36 and is rearwardly and reciprocally connected to a recoil mechanism of a conventional type (not shown). A plurality of track rollers 66 are removably secured to the track roller frame 12 in a conventional manner, and an endless track chain 68 is disposed about the idler wheel 54 and track rollers 66 for movement and support of the vehicle. As the vehicle is moved in the forward or rightward direction with respect to FIG. 1, a protruding object in front of the track chain 68 may well cause a rearward thrust force on the idler wheel 54. This force is transmitted rearwardly through the axle 52, the bearing brackets 38, 40, the yoke assembly 36, the shaft 64, and to the recoil mechanism on the undercarriage 10 in a conventional manner. In so doing, rearward and forward longitudinal movement is experienced between the associated sliding bearing surfaces 28 and 42, as well as surfaces 30 and 44 as the idler wheel 54 moves rearwardly and forwardly again after the obstacle has passed. Such sliding surfaces experience significant wear under normal field conditions due to the entry of dirt and deleterious material therebetween.

The guard and scraper of the subject invention, identified generally by the reference numeral 70, reduces the amount of accumulated debris on either side of the idler wheel 54. More particularly, a guard and scraper 70 is fixed to each bracket 38, 40 and includes an inwardly directed scraper portion 72, a central mounting portion 74, and an outwardly and downwardly directing shielding portion 76. The scraper portion 72 has an inwardly extending V-shaped scraping edge 78 which is contoured to the shape of the idler side 60 and extends adjacent thereto in close proximity thereto. The scraping edge 78 extends both longitudinally forwardly and rearwardly of and above the axle 52, so that in both directions of rotation of the idler wheel 54 the scraping edge 78 is effective to remove material accumulating on that idler wall. As material is deposited on the guard and scraper 70 from the endless track chain 68 during its circumnavigation of the idler wheel 54, an inclined surface 80, which is common to both the scraper portion 72 and mounting portion 74, directs such debris outwardly away from the idler wheel 54.

The central mounting portion 74 of each guard and scraper 70 includes a plurality of transversely elongated slots 82, as shown in FIG. 3. Such slots are adapted to receive loosely therethrough a plurality of retaining bolts 84 which are threadably secured in the upper face of each bearing bracket 38, 40. A lock washer arrangement 86 is disposed under the head of each retaining bolt 84, and each guard and scraper 70 is transversely positionable when the bolts 84 associated therewith are loosened to place the scraping edge 78 thereof proximate the associated idler sidewall 60. As the scraper edge 78 wears, the retaining bolts 84 may be loosened and the guard and scraper 70 urged inwardly to compensate therefor. Such means also of course allow each guard and scraper 70 to be adjusted away from the wheel 54 and side 60 as desired.

The outwardly and downwardly directed shielding portion 76 of each guard and scraper 70 includes a horizontal surface 88 which is blendingly associated with the inclined surface 80. A rolled edge 90 is blendingly associated with the horizontal surface 88, and a downwardly extending lip 92 depends therefrom in protecting, overlapping relation to the framed portion 14, 16. As dirt is deposited by the moving and vibrating track, the guard and scraper 70 assemblies, positioned above slidably associated areas, protect the areas of the slidably associated bearing surfaces 32 and 46, and 34 and 48, respectively.

Thus, the subject guard and scraper 70 assemblies function to remove debris from the idler wheel sides 60 regardless of the direction of travel of the idler wheel 54, due to the matching contours of the scraping edges 78 and the idler sides 60. Each guard and scraper 70 features elongated slots 82 for adjustment thereof to allow for wear of the scraping edge 78 thereof, and further protect the machine surfaces of the track roller frame 12 on which the yoke assembly 36 travels.

What is claimed is:

1. In a vehicle having a frame portion, axle means for rotatably supporting a rotatable member, and bracket means slidably associated with the frame portion and mounting said axle means, the improvement which comprises guard means fixed relative to the bracket means and extending above the slidingly associated areas of the bracket means and frame portion, wherein the guard means has an edge portion extending to adjacent a side of the rotatable member in close proximity thereto and substantially matching the contour of said side.

2. The vehicle of claim 1 wherein the edge portion of the guard means extends to adjacent said side of the rotatable member in close proximity thereto above and forwardly and rearwardly of said axle means.

3. The vehicle of claim 1 and means for allowing the guard means to be adjustably fixed relative to the bracket means so that such guard means may be adjusted toward and away from the side of the rotatable member, to allow adjustment of the extended portion of guard means in relation to the side of the rotatable member.

4. The vehicle of claim 3 and further comprising a track chain disposed about the rotatable member.

5. In a vehicle having a frame portion, axle means for rotatably supporting a rotatable member, and means associating the axle means and frame portion and mounting said axle means, the improvement which comprises guard means fixed relative to the means associating the axle means and frame portion and having an edge portion extending to adjacent a side of the rotatable member in close proximity thereto, and substantially matching the contour of the side, and extending above and forwardly and rearwardly of said axle means.

6. The vehicle of claim 5 and means for allowing the guard means to be adjustably fixed relative to the means associating the axle means and frame portion, so that the guard means are adjustable toward and away from the side of the rotatable member, to allow adjustment of the extended edge portion of the guard means in relation to the side of the rotatable member.

* * * * *